United States Patent
Rusta-Sallehy et al.

(10) Patent No.: US 6,936,081 B2
(45) Date of Patent: Aug. 30, 2005

(54) CHEMICAL HYDRIDE HYDROGEN REACTOR AND GENERATION SYSTEM

(75) Inventors: Ali Rusta-Sallehy, Richmond Hill (CA); Xuesong Chen, Brampton (CA); David G. Frank, Scarborough (CA)

(73) Assignee: Hydrogenics Corporation, Mississauga (CA)

( * ) Notice: Subject to any disclaimer, the term of this patent is extended or adjusted under 35 U.S.C. 154(b) by 136 days.

(21) Appl. No.: 10/016,132

(22) Filed: Dec. 17, 2001

(65) Prior Publication Data

US 2003/0113259 A1 Jun. 19, 2003

(51) Int. Cl.[7] .................................................. C01B 3/06
(52) U.S. Cl. .......................... 48/118.5; 48/61; 422/198; 422/211; 422/222; 422/234
(58) Field of Search ........................ 48/61, 62 R, 118.5, 48/197 R; 423/648.1, 657, 658.2; 422/173, 177, 180, 198, 211, 222, 234; 429/17, 19, 20

(56) References Cited

U.S. PATENT DOCUMENTS

| | | | | |
|---|---|---|---|---|
| 3,511,710 A | * | 5/1970 | Jung et al. ..................... | 429/15 |
| 3,594,557 A | * | 7/1971 | Anderson ...................... | 700/72 |
| 4,063,591 A | * | 12/1977 | Usher .......................... | 165/167 |
| 4,217,401 A | * | 8/1980 | Pellegri et al. ................ | 429/39 |
| 4,261,956 A | | 4/1981 | Adlhart | |
| 5,372,617 A | | 12/1994 | Kerrebrock et al. | |
| 5,514,353 A | | 5/1996 | Adlhart | |
| 5,690,763 A | * | 11/1997 | Ashmead et al. ............. | 156/60 |
| 5,702,491 A | | 12/1997 | Long et al. | |
| 5,833,934 A | | 11/1998 | Adlhart | |
| 6,183,695 B1 | * | 2/2001 | Godec et al. ................. | 422/79 |
| 6,309,519 B1 | * | 10/2001 | Napper ..................... | 204/228.6 |
| 6,470,569 B1 | * | 10/2002 | Lippert et al. ................ | 29/890 |
| 6,534,033 B1 | * | 3/2003 | Amendola et al. ....... | 423/648.1 |
| 2001/0022960 A1 | | 9/2001 | Kojima et al. | |
| 2002/0025462 A1 | | 2/2002 | Nakanishi et al. | |

FOREIGN PATENT DOCUMENTS

| | | |
|---|---|---|
| EP | 0 107 497 A2 | 5/1984 |
| EP | 1 170 249 A1 | 1/2002 |
| WO | WO 99/64146 | * 12/1999 |
| WO | WO 01/51410 A1 | 7/2001 |
| WO | WO 02/06153 A1 | 1/2002 |

OTHER PUBLICATIONS

B.H. Kang et al., Dynamic Behavior of Heat and Hydrogen Transfer in a Metal Hydride Cooling System, Int. J. Hydrogen Energy, 1996, pp. 769–774, vol. 21, No. 9, Elsevier Science Ltd., Great Britain.

V.C.Y. Kong et al., Development of Hydrogen Storage for Fuel Cell Generators. I: Hydrogen Generation Using Hydrolysis Hydrides, International Journal of Hydrogen Energy, 1999, pp. 665–675, 24, Elsevier Science Ltd.

* cited by examiner

Primary Examiner—Basia Ridley
(74) Attorney, Agent, or Firm—Bereskin & Parr (57) ABSTRACT

A system and reactor stack for generating hydrogen from a hydride solution in presence of a catalyst. The reactor stack includes a number of reactor plates and separator plates alternate with one another, to define reaction chambers alternating with coolant chambers. Each reactor plate has a first face defining a solution flow field and an opposing second face defining a coolant flow field. Each solution flow field comprises a common reaction chamber and a plurality of channels opening into the common reaction chamber. The catalyst is provided in the common reaction chamber. Each reaction chamber is configured to receive the hydride solution and to bring at least a portion of the hydride solution in contact with the catalyst. Each reaction chamber is in fluid communication with an adjacent reaction chamber and each coolant chamber is in fluid communication with an adjacent coolant chamber.

13 Claims, 9 Drawing Sheets

CHEMICAL HYDRIDE HYDROGEN REACTOR AND GENERATION SYSTEM

FIELD OF THE INVENTION

This invention relates to a hydrogen generation system and more particularly relates to a reactor for generating hydrogen from a chemical hydride.

BACKGROUND OF THE INVENTION

Hydrogen has been recognized as an environmentally friendly clean fuel of the future since it has various applications in power generation systems. For example, hydrogen can be used as a fuel for combustion engines, gas turbines, fuel cells, especially proton exchange membrane fuel cells, which use hydrogen and air to produce electricity, generating only water as a by-product. Fuel cells are being developed to replace traditional electricity generators because they produce clean, environmentally friendly energy. However, these fuel cells require external supply and storage devices for hydrogen. Extensive efforts have been made to develop a safe and efficient way to store hydrogen, especially in mobile applications. Conventional hydrogen storage technologies include liquid hydrogen, compressed gas cylinders, dehydrogenation of compounds, chemical adsorption into metal alloys and chemical storage as hydrides. However, each of these systems is either hazardous or bulky.

There are various prior art hydrogen generation systems that utilize chemical hydrides. One type of hydrogen generation system employs chemical hydrides in solid phase, e.g. granules. U.S. Pat. No. 5,372,617, comprises a closed vessel for mixing chemical hydride powder together with water. The water is introduced into the vessel through an inlet. The vessel contains a mechanical stirring device to ensure adequate contact between the powder and the water, and to prevent the powder from clumping. The hydrogen gas is removed through an outlet in the vessel, and is supplied directly to the fuel cell. These systems tend to be inefficient since the stirring mechanism consumes energy, and increases the overall weight and complexity of the system. Furthermore, the noise generated by the stirring is undesirable. In addition, the reaction rate tends to be low, making the hydrogen generation unpredictable and thus hard to control. The systems also tend to be large and cumbersome.

Another similar hydrogen generation system is disclosed in U.S. Pat. No. 5,702,491. The hydrogen generation system substantially comprises a thermally isolated container for containing chemical hydride, a preheater to heat the chemical hydride to a predetermined temperature before the chemical hydride is hydrolysed, a water pipe to supply water into the container to generate hydrogen. This system entails adiabatic arrangement and heating devices, hence results in lower energy efficiency and complicated structure.

U.S. Pat. No. 5,833,934 discloses a cartridge-type reactor comprising a storage compartment for storing chemical hydride particles, a water absorbent material for retaining water and a water distribution tube for introducing water into the mass of chemical hydride particles. Other cartridge arrangements can be found in, for example, U.S. Pat. Nos. 4,261,956, 5,514,353. Although the cartridge generator in U.S. Pat. No. 5,833,934 provides some improvement over prior art generator concepts, it still suffers, as all the above-mentioned generators, from poor thermal management of the reactor, and hence little if any control of reaction rate. The heating effects associated with the chemical hydride reaction, which is exothermic, can in turn positively or negatively affect the reaction rate and efficiency. Temperature plays an important role in chemical hydride reactions. It directly affects the reaction rate. Poor thermal management of the reactor may lead to undesirable reaction rate, deactivation of catalyst, production of unwanted by-product, and in extreme cases, clogging or damage to the reactor.

Another method of generating and storing hydrogen has been recently disclosed in WO 01/51410. This method uses a chemical hydride solution, such as $NaBH_4$, as a hydrogen storage medium. Generally, chemical hydride reacts with water in the presence of a catalyst to generate hydrogen, as shown in the equation below:

$$NaBH_4 + 2H_2O \rightarrow 4H_2 + NaBO_2 + HEAT$$

The chemical hydride acts as both the hydrogen carrier and the storage medium. Ruthenium, Cobalt, Platinum or any alloys thereof may be used to catalyze the above reaction. It is noted that hydrogen is liberated from both the borohydride ($NaBH_4$) solution and the water. The borohydride solution is relatively cheap, and is much easier and safer to handle and transport than liquid or pressurized hydrogen. As a result, there are a number of advantages associated with using borohydride as a method of storing hydrogen as a fuel for use in fuel cells.

WO 01/51410 discloses a system, where an aqueous chemical hydride solution contained in a vessel is brought into contact with a catalyst disposed in a containment system to generate hydrogen. However, there are still a number of problems associated with this liquid phased system. In particular, the reaction in the vessel is not regulated. The temperatures of the solution and catalyst are not uniform, resulting in unstable reaction rate and poor ability to respond in real time to the fuel (hydrogen) needs of the hydrogen consuming devices, such as fuel cells or the like. This ability is referred to as load following ability. Moreover, it is also difficult to control the amount of catalyst in contact with the chemical hydride solution, which makes it even more difficult to control the reaction.

Therefore, there remains a need for a chemical hydride reaction system and reactor which offer improved control of the reaction rate by providing improved thermal management of the hydride solution and more uniform contact between catalyst and chemical hydride solution.

SUMMARY OF THE INVENTION

It is an object of the invention to provide a system and a reactor which provide improved scalability, reaction temperature control, and load following ability.

According to a first aspect of the present invention, a reactor vessel for generating hydrogen from a hydride solution in presence of a catalyst is provided. The reactor vessel comprises:

a) at least one reaction chamber and at least one coolant chamber, each reaction chamber being configured to receive the hydride solution and to bring at least a portion of the hydride solution in contact with the catalyst, each coolant chamber being configured to receive a coolant flow;

b) at least one reactor plate having a first face and a second face in opposing relation with the first face, wherein the first face defines a portion of each reaction chamber and the second face defines a portion of each coolant chamber.

Preferably, the reactor vessel comprises a plurality of reactor plates and a plurality of separator plates alternating with one another, to define a plurality of reaction chambers alternating with a plurality of coolant chambers. Each reaction chamber is in fluid communication with an adjacent reaction chamber and each coolant chamber is in fluid communication with an adjacent coolant chamber.

According to a second aspect of the invention, a reactor plate for a hydrogen generating reactor having a reaction chamber and a coolant chamber is provided. The reactor plate comprises:

a) a first face defining at least a portion of the reaction chamber; and
b) an opposing second face defining at least a portion of the coolant chamber.

Preferably, the first face of the reactor defines a solution flow field therein and the second face defines a coolant flow field therein.

According to a third aspect of the invention, a system for generating hydrogen from a hydride solution in presence of a catalyst is provided. The system comprises:

a) a reactor vessel defining a reaction chamber and a coolant chamber, the reaction chamber being configured to bring at least a portion of the hydride solution in contact with the catalyst, the coolant chamber being located proximate to the reaction chamber for cooling of the hydride solution;
b) a solution supply means for delivering the hydride solution to the reaction chamber, the solution supply means being in fluid communication with the reaction chamber; and
c) a coolant supply means for delivering a coolant flow to the coolant chamber, the coolant supply means being in fluid communication with the coolant chamber;

wherein the coolant supply means is configured to control at least one of the flow rate and the temperature of the coolant flow through the coolant chamber, thereby improving control of the temperature of the hydride solution in the reaction chamber.

According to a fourth aspect of the invention, a method of generating hydrogen is provided. The method comprises the steps of:

a) contacting a catalyst with a hydride solution; and
b) providing a coolant flow proximate to the hydride solution for controlling the temperature thereof;
c) controlling at least one of the temperature and the flow rate of the coolant flow to improve temperature control of the hydride solution in contact with the catalyst.

The plate type chemical hydride hydrogen generation reactor according to the present invention is more compact than any existing reactors. Moreover, the plate reactor provides a better control of the reaction rate by controlling the amount of heat removed from the reactor. The reactor also provides the advantage of more uniform heat transfer and use of catalyst. The plate type reactor is especially useful for applications where constant or controlled amount of hydrogen is demanded by hydrogen consuming devices, such as fuel cells, engines and turbines. The plate type reactor is also simply to manufacture and assemble. It is also easy to be scaled up and hence has various applications.

BRIEF DESCRIPTION OF THE DRAWINGS

For a better understanding of the present invention, and to show more clearly how it may be carried into effect, reference will now be made, by way of example, to the accompanying drawings, which show a preferred embodiment of the present invention and in which.

DETAILED DESCRIPTION OF THE INVENTION

Figure 1A:
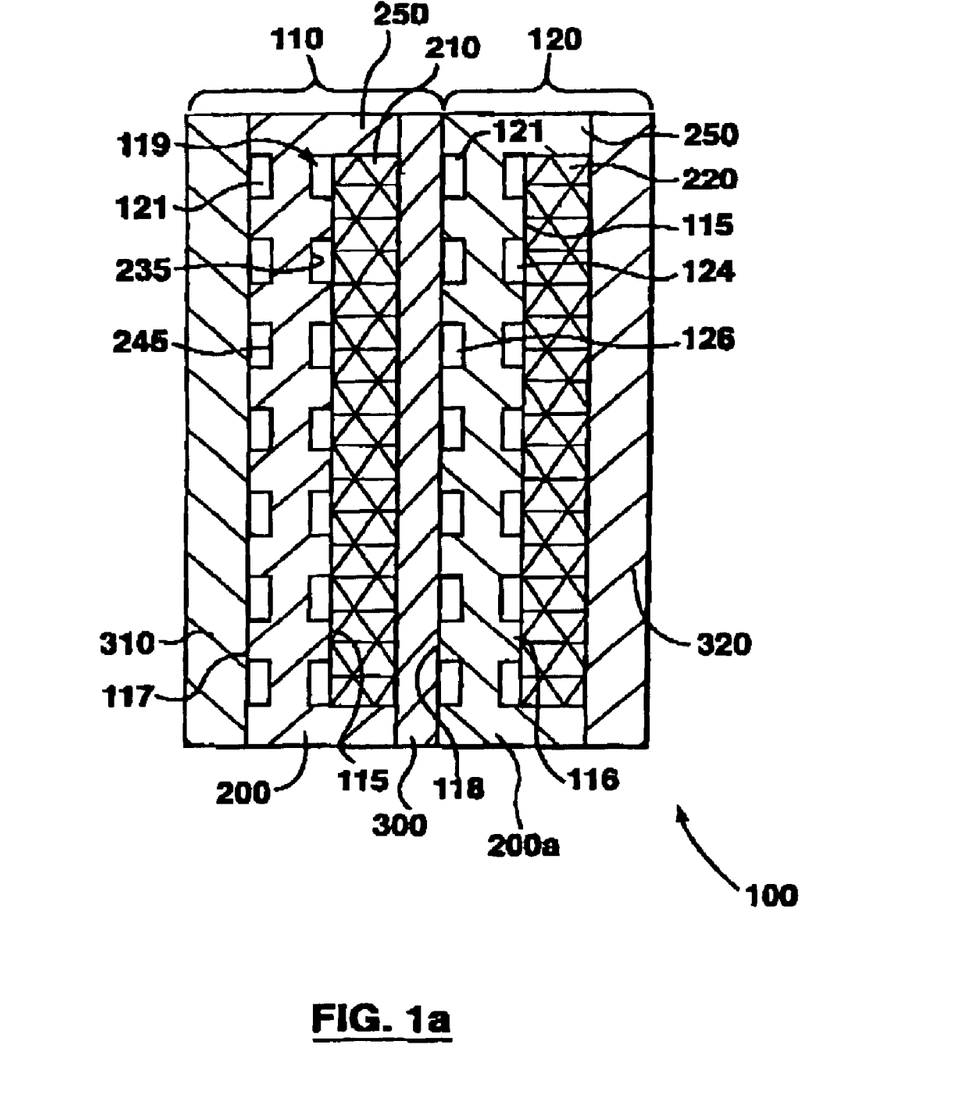
FIG. 1A shows a cross-sectional view of a reactor vessel according to a preferred embodiment the present invention, taken along line A—A of FIG. 1B.
Figure 1B:
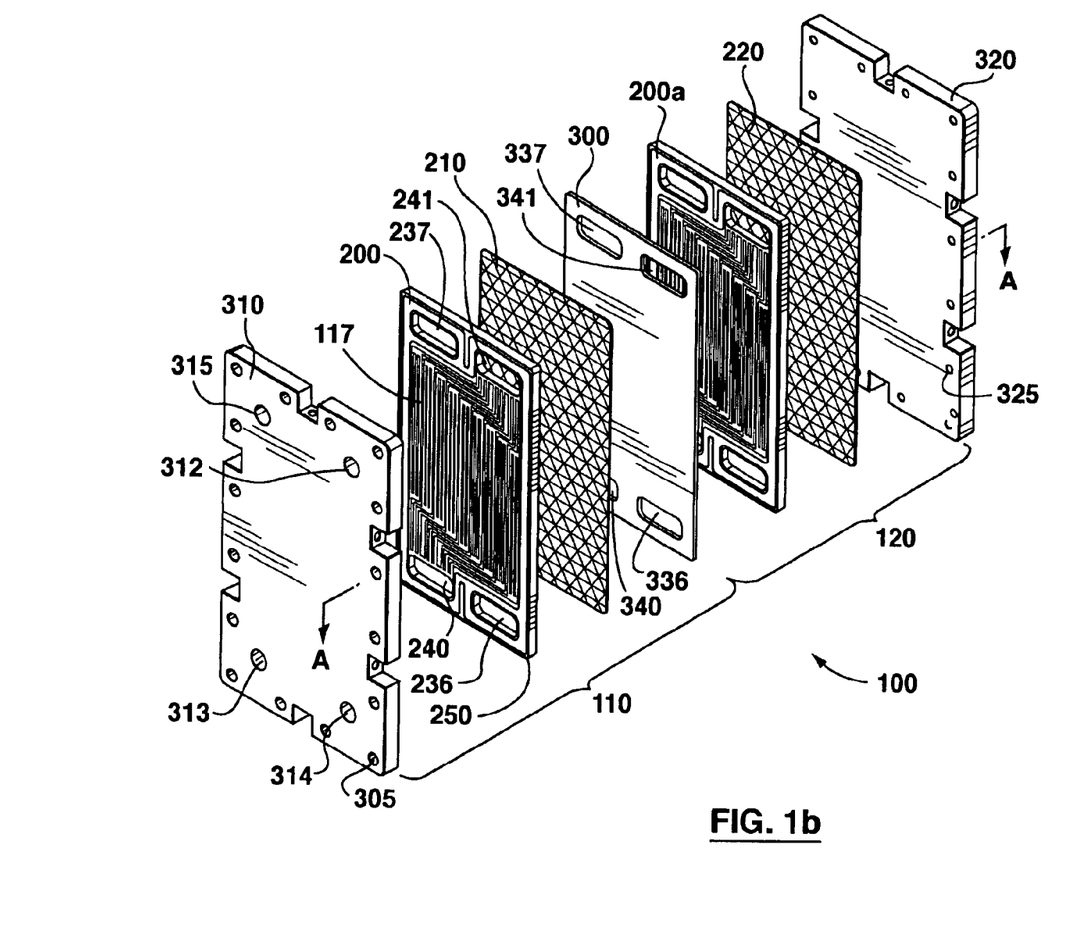
FIG. 1B shows an exploded perspective view of the reactor vessel.

FIGS. 1A and 1B show a chemical hydride reactor according to a preferred embodiment of the present invention, in which a first reactor vessel 110 and a second reactor vessel 120 are formed. However, it will be understood by those skilled in the art that the chemical hydride reactor may be constructed to include any number of reactor vessels, preferably disposed in parallel relation side by side or one on top of the other in a stack, as can best be seen in FIG. 1B. Hereinafter, the chemical hydride reactor will be referred to as the "reactor stack" 100.

Referring to FIGS. 1A and 1B, the reactor stack 100 includes a first reactor plate 200 and a first catalyst layer 210 located between a first end plate 310 and a separator plate 300. The above plates and the first catalyst layer 210 are preferably positioned substantially parallel to each other. Likewise, a second reactor plate 200*a* and a second catalyst layer 220 are positioned in a preferably identical configuration between the separator plate 300 and a second end plate 320. The first end plate 310, along with a rim 250 of the first reactor plate, and the separator plate 300 define the first reactor vessel 110. The second end plate 320, along with the rim 250 of the second reactor plate 200*a*, and the separator plate define the second reactor vessel 120.

Preferably, the first and second reactor plates 200, 200*a*, and the first and second catalyst layers 210, 220 are identical. Consequently, only the first reactor plate 200 and the first catalyst layer 210 will be described in detail.

Figure 4:
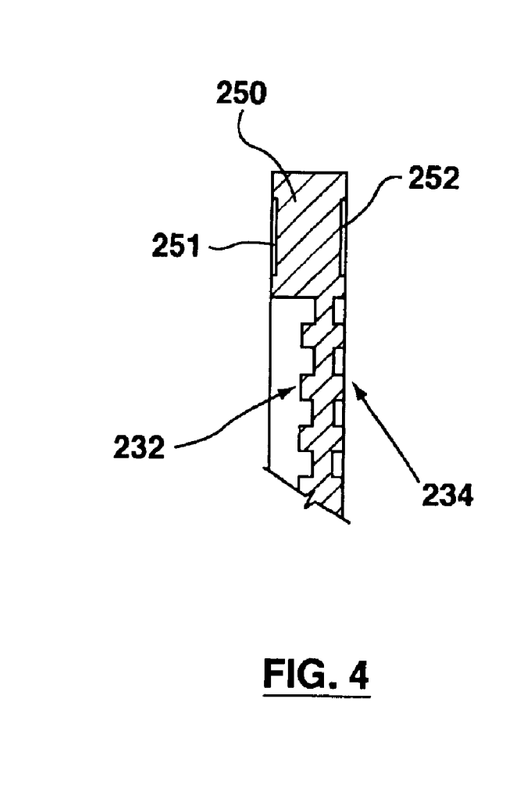
FIG. 4 shows partial sectional view of the reactor plate taken along line A—A in FIG. 2.

Referring to FIGS. 1A and 4, the first reactor vessel 110 includes a reaction chamber 119 and a coolant chamber 121. The separator plate 300 abuts against the rim 250 that extends around the edge and protrudes from a first face 115 of the first reactor plate 200. A first gasket groove 251 is formed along the rim 250 in the first face 115 of the first reactor plate 200. A first gasket 400 (shown in FIG. 2) located in the first gasket groove 251 provides a seal between the rim 250 of the first reactor plate 200 and the separator plate 300 to form a reaction chamber 119 within the first reactor vessel 110. The first catalyst layer 210 is located in the reaction chamber 119, preferably abutting the first face 115 of the first reactor plate 200.

Referring again to FIGS. 1A and 1B, a first end plate 310 abuts against the second face 117 of the first reactor plate

200. A second gasket 401 (shown in FIG. 3) located in the second gasket groove 252 (shown in FIG. 4) of the rim 250 seals the second face 117 of the first reactor plate 200 against the first end plate 310 to form a coolant chamber 121 within the first reactor vessel 110. The gaskets 400 and 401 may be made from any suitable resilient materials, such as rubber.

A second reaction chamber 124 and a second coolant chamber 126 are provided in the second reactor vessel 120 in a similar fashion, except that the rim 250 of a first face 116 of the second reactor plate 200a abuts against the second end plate 320 to form the second reaction chamber 124, and a second face 118 of the second reactor plate 200a abuts against the separator plate 300 to form the second coolant chamber 126.

In operation, pressure may be applied on the end plates 310, 320 to seal the reactor plates 200, 200a, the separator plate 300, and the end plates 310, 320 of the reactor stack 100. Preferably, a number of tie rods (not shown) may also be provided. The tie rods are screwed into threaded bores 305 in a first end plate 310, and pass through corresponding plain bores 325 in the second end plate 320. Conventional fasteners, such as nuts, bolts, washers or the like may be used to clamp together the reactor plates 200, 200a, separator plate 300 and catalyst layers 210, 220 and the entire reactor stack 100.

Figure 6:
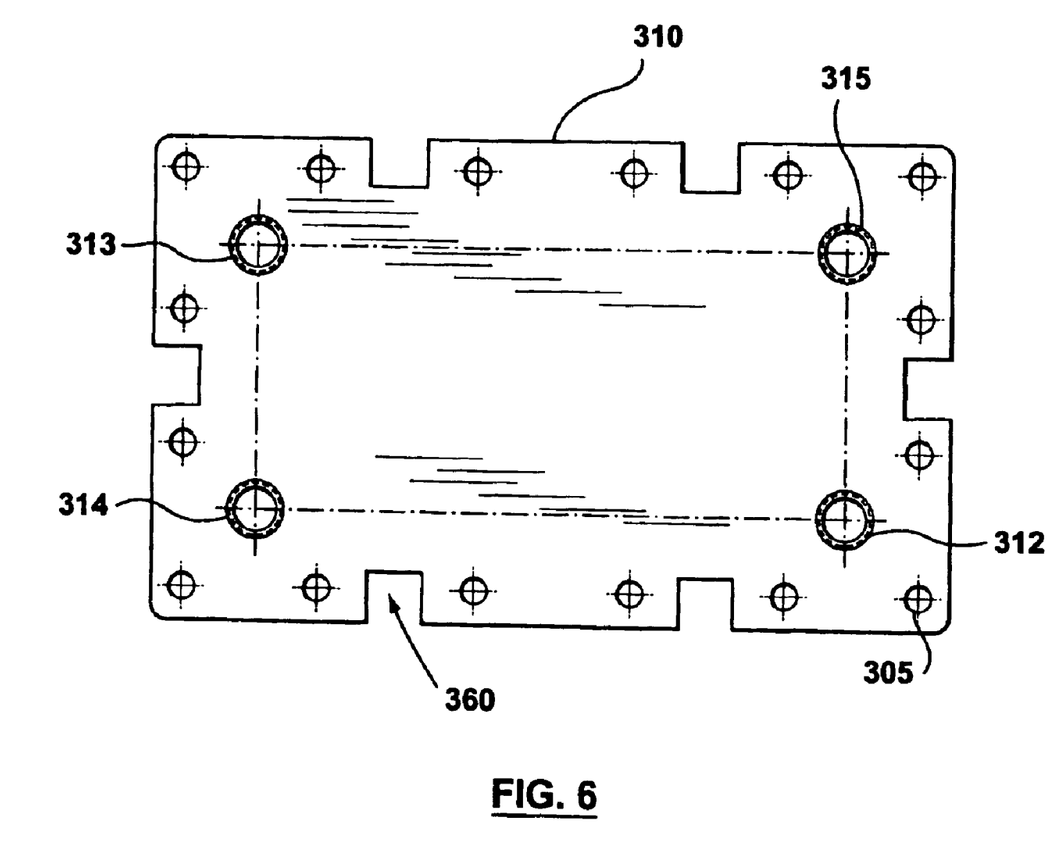
FIG. 6 shows an elevational view of an external face of a first end plate of the reactor vessel.
Figure 7:
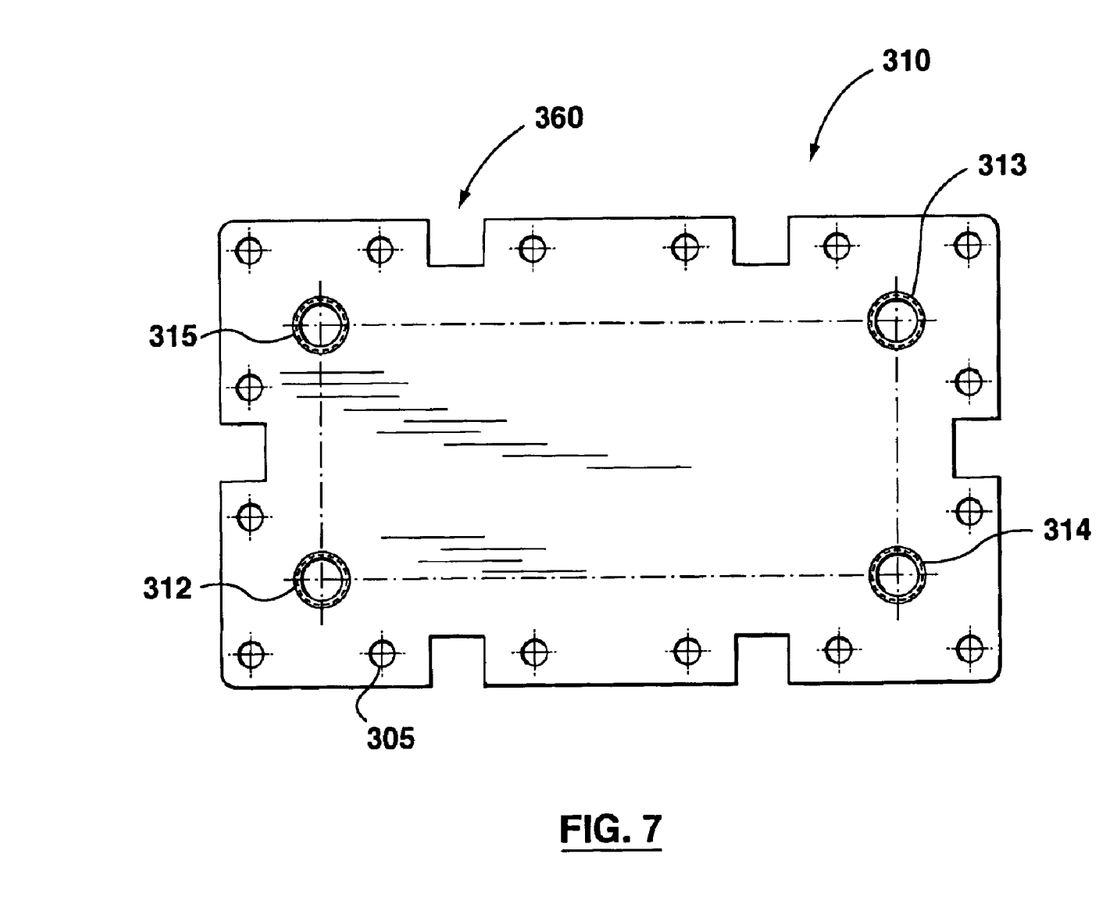
FIG. 7 shows an elevational view of an internal face of the first end plate of the reactor vessel.

Referring to FIGS. 1B, 6 and 7, first and second coolant connection ports 312, 313, and first and second solution connection ports 314, 315 are provided in the first end plate 310.

Figure 2:
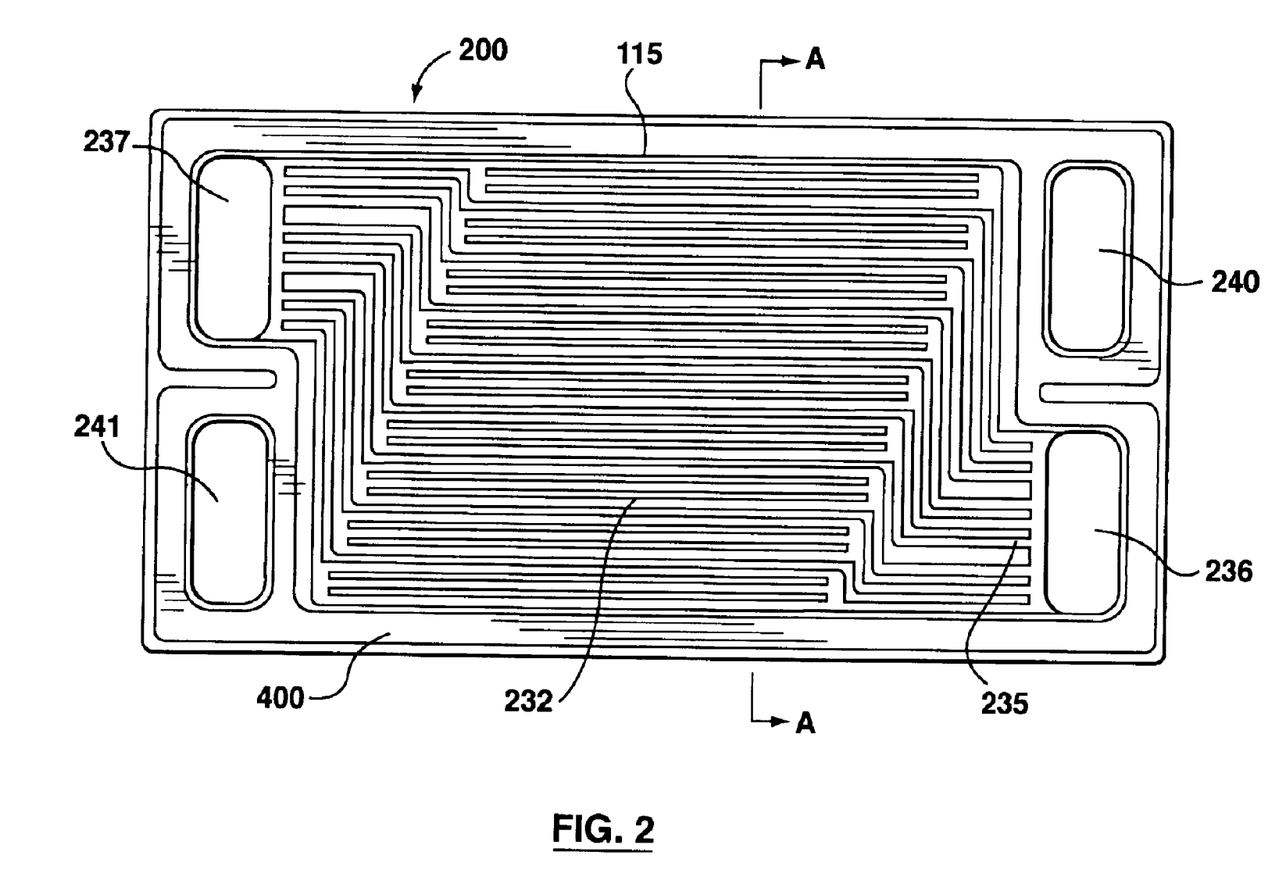
FIG. 2 shows an elevational view of a first face of the reactor plate according to the preferred embodiment of the present invention.

FIG. 2 shows the first face 115 face at first reactor plate 200, which forms a portion of the reaction chamber 119. The first reactor plate 200 is preferably rectangular in shape and has two parts at each end thereof. At one end, a solution inlet 238 and a coolant outlet 240 are provided. At the opposite end, a solution outlet 237 and a coolant inlet 241 are provided. The rim 250 and gasket 400 surrounds the coolant inlet 241 and coolant outlet 240 to prevent the coolant from entering the reaction chamber 119. A solution flow field 232 preferably having a number of open-faced parallel tortuous channels 235 is formed within the first face 115 of the first reactor plate 200. The channels 235 extend between the solution inlet 236 and the solution outlet 237. The solution inlet 236 and solution outlet 237 for chemical hydride solution communicate with the first and second solution connection ports 314, 315, respectively.

Figure 3:
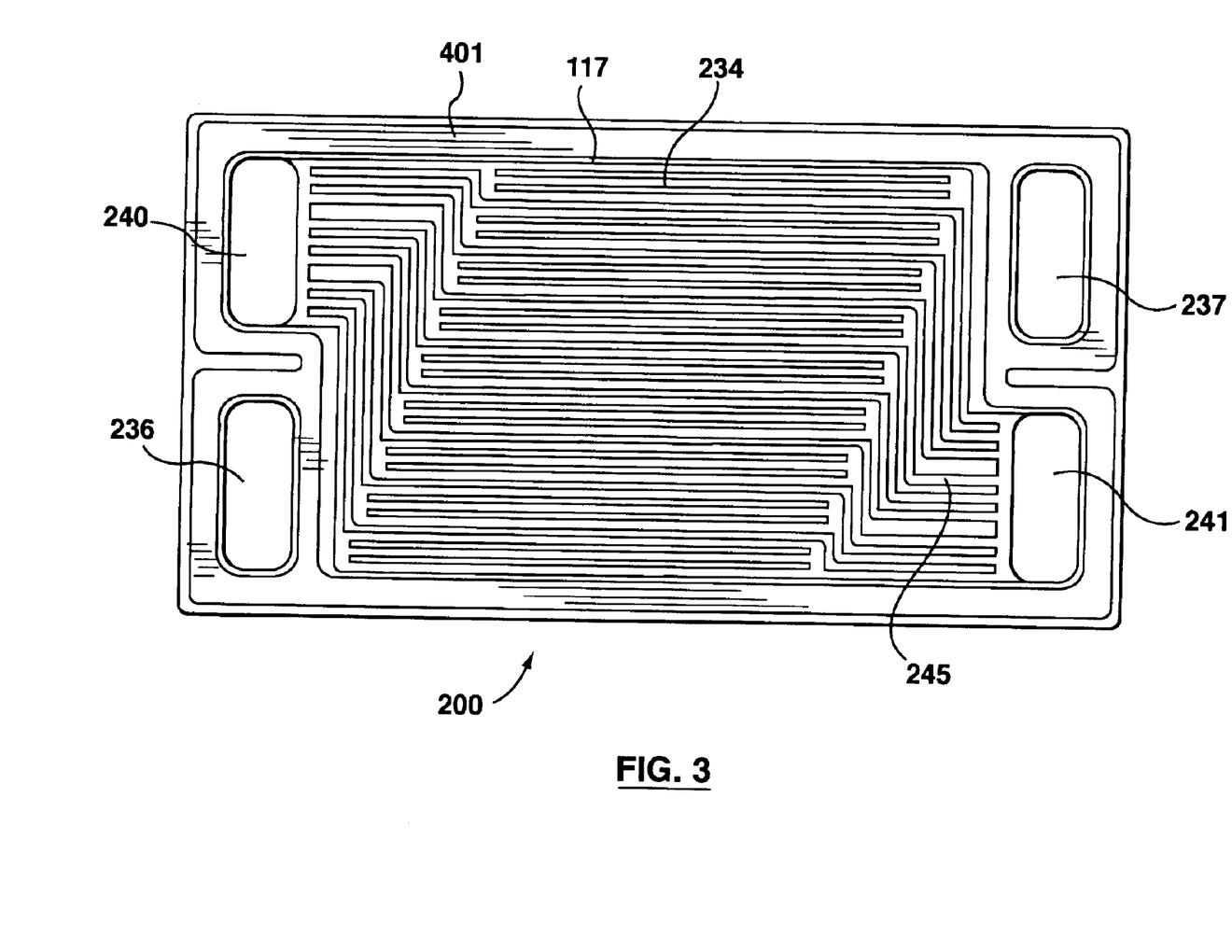
FIG. 3 shows an elevational view of the second face of the reactor plate.

FIG. 3 shows the second face 117 of the first reactor plate 200, which forms a portion of the coolant chamber 121. A coolant flow field 234 preferably composed of a number of substantially parallel tortuous open-faced channels 245 is formed in the second face 117. The channels 245 extend between the coolant inlet 241 and coolant outlet 240. The gasket 401 provides a seal around the solution inlet 236 and solution outlet 237 to prevent the hydride solution from entering the coolant chamber 121. The coolant inlet 241 and coolant outlet 240 communicate with the first and second coolant connection ports 312, 313, respectively. The preferred coolant is water, but may be any other conventional heat transfer fluid.

It will be understood by those skilled in the art the configuration of channels 235 on the first face 115 is only one possible configuration and the channels 235 may be configured in a number of different ways between the solution inlet 236 and solution outlet 237. For example, the channels need not be parallel. Likewise, the coolant channels 245 may also be configured in different ways which may be identical or different from the solution channels 245. For example (not shown), the second face 117 of the first reactor plate 200 may be smooth with only a recess extending between the coolant inlet 241 and outlet 240 for coolant flow.

Referring again to FIG. 3, the coolant flow field 245 according to the preferred embodiment of the present invention provides advantages by providing a longer flow path for the coolant and more even distribution of coolant, thereby providing a better cooling result. The longer flow path is achieved by locating solution inlet 236 and solution outlet 237 near two ends along a diagonal of the rectangular first reactor plate 200. Similarly, the coolant inlet 241 and coolant outlet 240 are provided substantially near the two ends along other diagonal of the rectangular reactor plate 200.

Referring now to FIG. 1B, the first catalyst layer 210 may be a layer or layers of foam impregnated with a catalyst shaped to fit into the reaction chamber 119 of the first reactor vessel 110, such that the first catalyst layer closes the open channels 235 of the flow field 232. The catalyst may be any suitable compound for generating hydrogen from a chemical hydride solution. Preferably, the catalyst is one or more of Ruthenium, Cobalt, Platinum or any alloys thereof, and the hydride solution is $NaBH_4$ in water.

In accordance with an alternative embodiment of the invention (not shown), the catalyst layer may be replaced by catalyst material which is coated or deposited directly onto the flow field 232. Accordingly, when chemical hydride solution enters the flow field from the inlet 236 and flows across the flow field, the solution comes into contact with the catalyst and generates hydrogen. In this embodiment, it would not be necessary to provide space between the separator plate 300 and the flow field 232, hence the rim 250 does not need to be made protruding from the front face of the first reactor plate 200. In addition, the catalyst can be in the form of pellets that is accommodated in the space between the separator plate 300 and the flow field 232. These pellets can be placed on the plates during assembly of the reactor stack 100.

Figure 5:
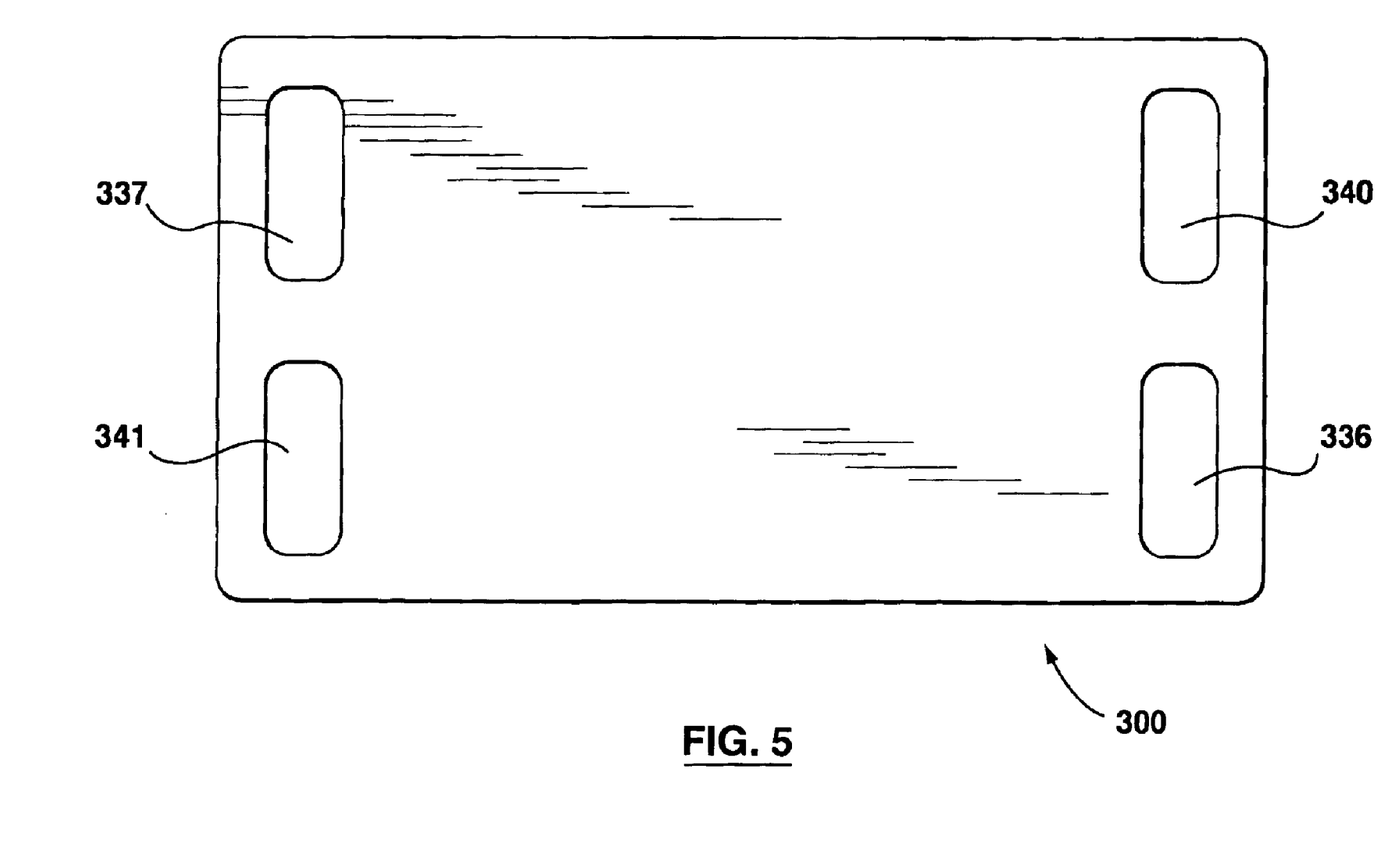
FIG. 5 shows a front elevational view of a separator plate according to the preferred embodiment of the present invention.

FIG. 5 shows one face of the separator plate 300 which is identical to the opposing face (not shown). Preferably, the separator plate 300 is a flat rectangular plate with two ports provided near each end thereof. Specifically, a separator solution inlet 336 and a separator coolant outlet 340 are formed near one end of the separator plate 300 while a separator solution outlet 337 and a separator coolant inlet 341 are formed near the opposite end thereof. As shown most clearly in FIG. 1B, the ports on the separator plate 300 communicate with ports on the first and second reactor plates 200 and 200a so that when the plates stack together, the inlets and outlets form four distribution conduits or ducts that extend throughout the reactor stack to distribute the solution and coolant from the first reactor plate 200 to second reactor plate 200a. The ducts communicate with the respective ones of the ports 312–315, as described above and shown in FIG. 1B.

While only two reactor plates 200, 200a and one separator plate 300 are shown, it will be understood that a plurality of alternating reactor plates 200 and separator plates 300 could be provided, all sandwiched between the first and second end plates 310, 320.

The reactor plates 200, 200a and separator plates 300 can be made from Titanium, stainless steel, graphite, or the like.

Figure 8:
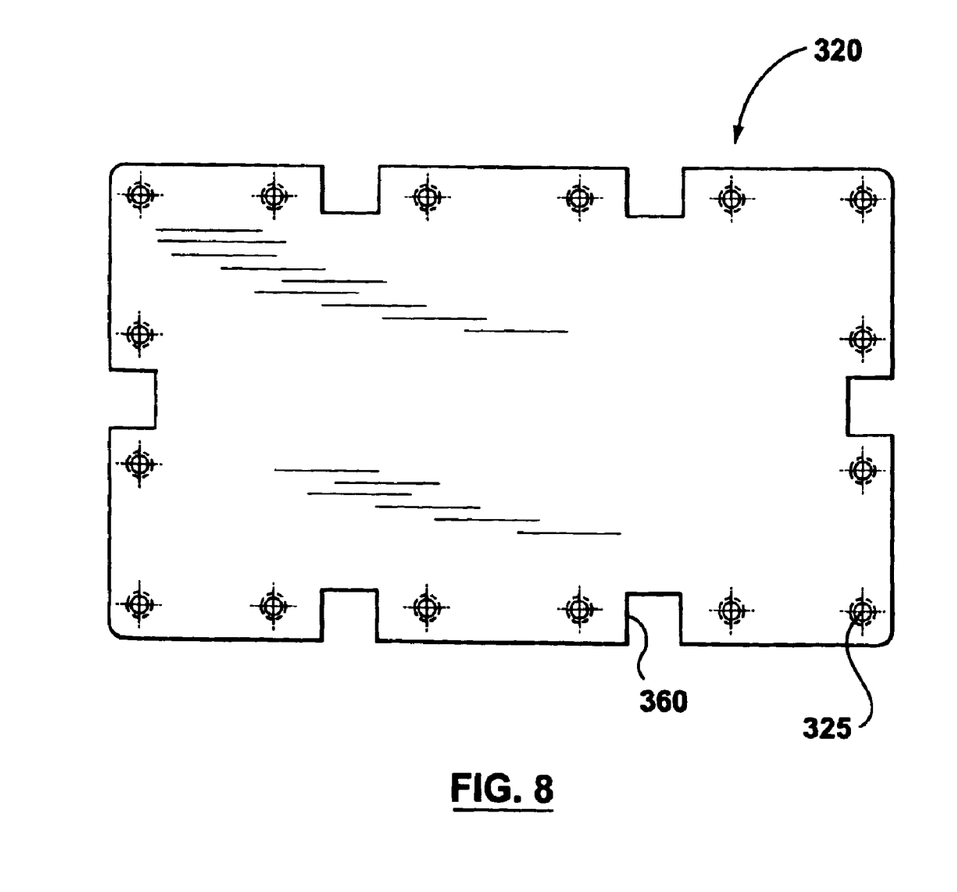
FIG. 8 shows a front elevational view of a second end plate of the reactor vessel.

FIG. 8 shows a second end plate 320. Preferably, the second end plate 320 does not include any connection ports for distributing fluids. The sealing between the end plates and the adjacent reactor plates is provided by the gasket 400 described above in the same manner as for the separator plate 300. As shown in FIGS. 6, 7 and 8, the first and second end plates 310 and 320 are preferably provided with a plurality of notches 360 along its edges. These notches are used in assembly to facilitate alignment of the plates.

The operation of the hydrogen generation system according to the present invention will now be described with reference to FIGS. 1B and 9. The chemical hydride solution is delivered to the reactor stack 100 by a solution supply means. Preferably, the solution supply means is a conventional first pump 510 which draws the hydride solution from a solution storage tank 520 through a pipe 530. The pipe 530 communicates with the first solution connection port 314, which in turn communicates with the solution inlet 236 of the first reactor plate 200.

Referring now to FIGS. 1A and 1B, a portion of the chemical hydride solution enters the first reaction chamber 119 of the first reactor vessel 110 through the solution inlet 236, and flows along the channels 235 in the flow field 232, where the solution comes into contact with the first catalyst layer 210. The chemical hydride solution generates hydrogen in the presence of the catalyst. The unreacted solution continues to flow along the flow field 232, and ultimately exits the reactor plate 200 via the solution outlet 237. The generated hydrogen is entrained in the solution and flushed out of the solution outlet 237 by the incoming solution.

As shown in FIG. 1B, the remaining solution flows into separator solution inlet 336 of separator plate 300 and into the solution inlet 236 of second reactor plate 200a, where it enters the second reaction chamber 124 and follows a path identical to that described above.

Figure 9:
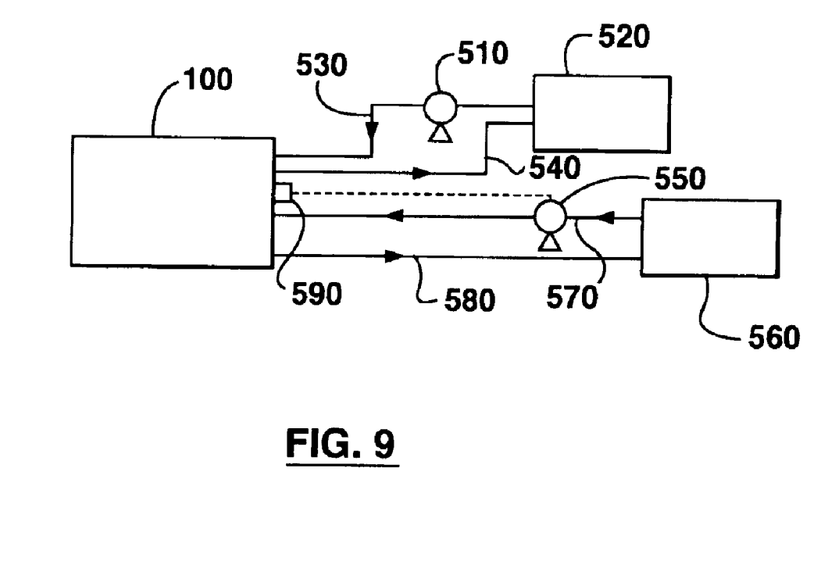
FIG. 9 shows a schematic view of the hydrogen generation system according to the preferred embodiment of the present invention.

Referring to FIG. 9, the solution exits solution outlet 237 through second solution connection port 315 and is returned to the solution storage tank 520 via pipe 540. The solution is then continuously recirculated through the reactor stack 100 in the manner described above.

Referring to FIG. 9, the coolant is delivered to the reactor stack 100 by a coolant supply means. Preferably, the solution supply means is a second pump 550 which draws the coolant from a coolant container 560 through a pipe 570. The pipe 570 communicates with the first coolant connection port 312, which in turn communicates with the coolant inlet 241 of the first reactor plate 200.

Referring again to FIGS. 1A and 1B, a portion of the coolant enters the coolant chamber 121 through the coolant inlet 241, and flows along the channels 245 in the flow field 234. The coolant comes into contact with the second face 117 of the first reactor plate 200 and to transfer the heat generated in the chemical hydride hydrogen generation reaction occurring on the first face 115 to the coolant. The coolant then exits the coolant chamber 121 via the coolant outlet 240.

As shown in FIG. 1B, the remaining coolant flows into separator coolant inlet 341 of separator plate 300 and into the coolant inlet 241 of second reactor plate 200a, where it follows a path identical to that described above.

Referring to FIG. 9, the coolant exits coolant outlet 240 through second coolant connection port 313 and is returned to the coolant container 560 via pipe 580. The coolant is then continuously recirculated through the reactor stack 100 in the manner described above. A temperature sensor 590 is placed within the reactor stack 100 to monitor the temperature of the solution. The sensor 590 is electrically connected to the second pump 550 through a conventional control device such that the pump 550 can alter the flow rate of the coolant to provide a desired solution temperature.

As is known in the art, the chemical hydride hydrogen generation reaction is exothermic and the reaction rate is sensitive to temperatures. Experiments have shown that approximately every 10° C. rise in temperature results in doubled reaction rate. In order to keep the reaction from running away, the heat has to be removed efficiently. On the other hand, the chemical hydride solution is usually circulated between the reactor stack 100 and a solution storage tank 520, and hence, as the reaction proceeds, the concentration of chemical hydride in the solution decreases. This decrease will reduce the reaction. However, this can be effectively compensated by an increase in reaction temperature. Therefore, in order to achieve a constant reaction rate as may be required in some applications, such as supplying hydrogen to fuel cells, a better temperature control is desired. The reactor plate arrangement of the present invention provides a way of effectively controlling the temperature of reaction by adjusting the flow rate of coolant.

While the above description constitutes the preferred embodiments, it will be appreciated that the present invention is susceptible to modification and change without departing from the fair meaning of the proper scope of the accompanying claims. The spirit of the invention relates to using plate type reactor to achieve bettering thermal management of the chemical hydride hydrogen generation reaction. It should be appreciated that the shape of the reactor plates and/or reactor stacks of the present invention are not limited to those disclosed in the above description. For example, the coolant does not need to flow along countercurrent direction with respect to chemical hydride flow although this arrangement provides the advantage of sufficiently heat exchange between the solution and the coolant. The reactor plates are not necessarily rectangular in shape. In addition, the chemical hydride solution used to generate hydrogen is not limited to borohydride water solution. Rather, the hydride can comprise one or a combination of: $NaBH_4$, $LiBH_4$, $KBH_4$, $RbH_4$, or the like. Additionally, the number and arrangement of the components in the system might be varied, but may still fall within the scope and spirit of the claims.

What is claimed is:

1. A reactor vessel, for generating hydrogen train a hydride solution in presence of a catalyst, the reactor vessel comprising:

a plurally of reaction chambers end a plurality of coolant changes alternating with one another, each reaction chamber being configured to receive the hydride solution and to bring at least a portion of the hydride solution in contact with the catalyst, each coolant chamber being configured to receive a coolant flow; and a plurality of reactor plates, each having a first face and a second face in opposing relation with the first face, wherein the first face defines a solution flow field and a portion of one reaction chamber, end the second face defines a coolant flow field and a portion of one coolant chamber;

wherein each reactor plate includes a solution inlet and a solution outlet located opposite to one another and in communication with the solution flow field, and a coolant inlet end a coolant outlet located opposite to one another and in communication with the coolant flow field and wherein the solution inlet, the solution outlet, the coolant inlet and the coolant outlet all extend through the reactor plates, for forming distribution ducts from a plurally of similar reactor plates stacked together;

wherein a plurality of separator plates alternate with the reactor plates, to define the plurally of reaction chambers alternating with the plurality of coolant chambers, each reaction chamber being in fluid communication with an adjacent one of the plurality of reaction chambers and each coolant chamber being in fluid communication with an adjacent coolant chamber, such separator plate including openings providing inlets and outlets for the coolant and the hydride solution aligned with the coolant and solution inlets and outlets of the reactor plates whereby the distribution ducts are farmed extending through the reactor plates and the separator plates to distribute both the hydride solution and the coolant to the reaction and coolant chambers and to collect the hydride solution and the coolant from the reaction and the coolant chambers;

wherein each solution flow field comprises a common reaction chamber, and a plurality of channels opening into the common reaction chamber, wherein the catalyst is provided in the reaction chamber, and wherein a rim is provided around and partially defining the reaction chamber; and wherein gasket grooves are provided between the reactor and separator plates, with one casket groove being provided in the rim around each reaction chamber, and gaskets are provided in the casket grooves between adjacent pairs of reactor and separator plates.

2. The reactor vessel of claim 1, wherein the solution flow field comprises a plurality of solution channels therein and the coolant flow field comprises a plurality of coolant channels.

3. The reactor vessel of claim 2, further comprising a catalyst located on at least portion of the plurality of the solution channels.

4. The reactor vessel of claim 3, wherein the catalyst is in pellet form.

5. The reactor vessel claim 2, wherein the plurality of the solution to the channels extend from the solution inlet to the solution outlet, and the plurality of coolant channels extend from the coolant inlet to the coolant outlet.

6. The reactor vessel of claim 5, wherein the reactor plate is rectangular, the solution inlet and the solution outlet being located proximate to diagonal corners thereof, and the coolant inlet and coolant outlet being located proximate to remaining diagonal corners thereof.

7. The reactor vessel of claim 5, wherein the reactor plates and the separator plates are positioned in substantially parallel spaced relationship, thereby forming a stack of the plurality of reactor vessels, and wherein means are provided for clamping the reactor plates and the separator plates together.

8. The reactor plate of claim 7, wherein the solution channels are substantially parallel.

9. The reactor plate of claim 8, wherein the coolant channels are substantially parallel.

10. The reactor vessel of claim 2, wherein the solution flow field comprises a plurality of tortuous channels extending between the solution inlet and the solution outlet.

11. The reactor vessel of claim 10, wherein the coolant flow field comprises a plurality of tortuous channels extending between the coolant inlet and the coolant outlet.

12. A system for generating hydrogen from a hydride solution in presence of a catalyst, the system comprising:
a) a solution supply means for supplying the hydride solution;
b) a coolant supply means for supplying a coolant flow; and
c) a reactor vessel as defined in claim 1.

13. The system of claim 12, wherein the coolant supply means is configured to control at least one of the temperature and the flow rate of the coolant flow through the coolant chamber, thereby improving control of the temperature of the hydride solution in the reaction chamber.

* * * * *